(12) United States Patent
Mironets et al.

(10) Patent No.: US 9,597,730 B2
(45) Date of Patent: Mar. 21, 2017

(54) BUILD PLATE AND APPARATUS FOR ADDITIVE MANUFACTURING

(71) Applicant: United Technologies Corporation, Hartford, CT (US)

(72) Inventors: Sergey Mironets, Charlotte, NC (US); Agnes Pu Hang Chau Klucha, Glastonbury, CT (US); Wendell V. Twelves, Jr., Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/784,904

(22) PCT Filed: Apr. 16, 2014

(86) PCT No.: PCT/US2014/034422
§ 371 (c)(1),
(2) Date: Oct. 15, 2015

(87) PCT Pub. No.: WO2014/172496
PCT Pub. Date: Oct. 23, 2014

(65) Prior Publication Data
US 2016/0144428 A1 May 26, 2016

Related U.S. Application Data

(60) Provisional application No. 61/814,106, filed on Apr. 19, 2013.

(51) Int. Cl.
*G03F 7/20* (2006.01)
*B22F 3/105* (2006.01)
(Continued)

(52) U.S. Cl.
CPC .......... *B22F 3/1055* (2013.01); *B23K 15/002* (2013.01); *B23K 15/0086* (2013.01);
(Continued)

(58) Field of Classification Search
CPC .......................... B22F 3/1055; B29C 67/0085
See application file for complete search history.

(56) References Cited

U.S. PATENT DOCUMENTS 5,525,050 A   6/1996  Takizawa et al.
5,753,274 A   5/1998  Wilkening
(Continued)

FOREIGN PATENT DOCUMENTS

CN    1018568724 A    10/2010
CN    102266942 A    12/2011
(Continued)

OTHER PUBLICATIONS

JPO machine translation of JP 2012-224906, translated Sep. 14, 2016.*

(Continued)

*Primary Examiner* — Timothy Kennedy
(74) *Attorney, Agent, or Firm* — Kinney & Lange, P.A.

(57) ABSTRACT

A powder bed deposition apparatus comprises a movable build plate, a powder delivery system, an energy beam apparatus capable of selectively steering at least one focused energy beam over successive quantities of metal powder, a non-metallic barrier layer, and an anchor removably secured to the build plate. The non-metallic barrier layer is disposed over a metal upper surface of the build plate. The anchor has a metal bonding surface flush with the non-metallic barrier layer, the non-metallic barrier layer and the anchor defining a removable build assembly with a powder bed working surface.

20 Claims, 4 Drawing Sheets (51) Int. Cl.
  *B29C 67/00* (2006.01)
  *B33Y 40/00* (2015.01)
  *B23K 15/00* (2006.01)
  *B23K 26/08* (2014.01)
  *B33Y 10/00* (2015.01)
  *B33Y 30/00* (2015.01)
  *B33Y 70/00* (2015.01)

(52) U.S. Cl.
  CPC ......... *B23K 26/083* (2013.01); *B23K 26/144* (2015.10); *B23K 26/342* (2015.10); *B29C 67/0085* (2013.01); *B29C 67/0092* (2013.01); *B33Y 40/00* (2014.12); *B22F 2003/1056* (2013.01); *B22F 2003/1058* (2013.01); *B33Y 10/00* (2014.12); *B33Y 30/00* (2014.12); *B33Y 70/00* (2014.12); *Y02P 10/295* (2015.11)

(56) References Cited

U.S. PATENT DOCUMENTS

| | | | |
|---|---|---|---|
| 6,042,774 A * | 3/2000 | Wilkening | B23K 26/34 264/460 |
| 6,483,596 B1 | 11/2002 | Philippi et al. | |
| 6,824,714 B1 | 11/2004 | Turck et al. | |
| 8,317,508 B2 | 11/2012 | Bokodi et al. | |
| 2004/0026418 A1 | 2/2004 | Ederer et al. | |
| 2009/0202378 A1 | 8/2009 | Illston | |
| 2010/0047470 A1 | 2/2010 | Abe et al. | |

FOREIGN PATENT DOCUMENTS

| | | |
|---|---|---|
| JP | 4054075 B2 | 2/2008 |
| JP | 2009001900 A | 1/2009 |
| JP | 2010100883 A | 5/2010 |
| JP | 2010100884 A | 5/2010 |
| JP | 2012224906 A | 11/2012 |
| WO | WO2008146698 A | 12/2008 |

OTHER PUBLICATIONS

International Search Report and Written Opinion from PCT Application Serial No. PCT/US2014/034422, dated Aug. 7, 2014, 11 pages.

Extended European Search Report for EP Application No. 14784777.6, Dated Nov. 11, 2016, 11 Pages.

Office Action from Chinese Application Serial No. 201480022180.1, Dated Nov. 2, 2016, 15 Pages.

* cited by examiner

BUILD PLATE AND APPARATUS FOR ADDITIVE MANUFACTURING

BACKGROUND

The described subject matter relates generally to additive manufacturing. More particularly, the subject matter relates to powder bed additive manufacturing.

Additive manufacturing, also known as solid freeform (SFF) manufacturing, refers generally to a category of manufacturing methods characterized by the fact that the finished part is created by layer-wise construction of a plurality of thin sheets of material. Additive manufacturing typically involves iteratively applying liquid or powder material to a working surface, then performing some combination of sintering, curing, melting, and/or cutting to create each layer. The process is repeated to construct a near-net shape component which can then be finished into the final product.

Various types of additive manufacturing are known. Examples include various powder-based processes including electron beam melting in which an electron beam selectively melts powder to form each layer; laser additive manufacturing where powder is selectively melted using a laser, and direct metal deposition. Powder-based processes typically involve rapid heating and solidification as the energy beam is passed over the powder. Support structures, such as a heat sink, honeycomb, and/or anchors have been fused to an upper surface of a thick metal build table, to dissipate heat and prevent distortion of the component as it is built in a layerwise fashion thereon. With this conventional arrangement, one or more additional stress-relieving steps must then be performed prior to separating the build plate, the support structure(s), and the near-net shape component.

SUMMARY

A powder bed deposition apparatus comprises a movable build plate, a powder delivery system, an energy beam apparatus capable of selectively steering at least one focused energy beam over successive quantities of metal powder, a non-metallic barrier layer, and an anchor removably secured to the build plate. The non-metallic barrier layer is disposed over a metal upper surface of the build plate. The anchor has a metal bonding surface flush with the non-metallic barrier layer. The non-metallic barrier layer and the anchor defining a removable build assembly with a powder bed working surface.

A build platform comprises a build plate with a metal upper surface, and a build assembly removably secured to the build plate. The build assembly includes a powder bed working surface having a non-metallic barrier portion and a metal bonding portion. the non-metallic bather portion is disposed over the metal upper surface of the build plate, and the metal bonding portion is flush with the non-metallic barrier portion.

A method for manufacturing a near-net shape component comprises removably securing a powder bed working surface to a movable build plate with a metal upper surface. The powder bed working surface has a non-metallic barrier portion disposed over the metal upper surface of the build plate, and a metal bonding portion flush with the non-metallic bather portion. A quantity of metal powder is supplied from a powder delivery system to form a first powder build layer on the powder bed working surface. A first component build layer is formed by operating an energy beam apparatus to selectively steer at least one focused energy beam over the first powder build layer. The first component build layer is adhered to the metal bonding portion of the powder bed working surface.

DETAILED DESCRIPTION

Figure 1:
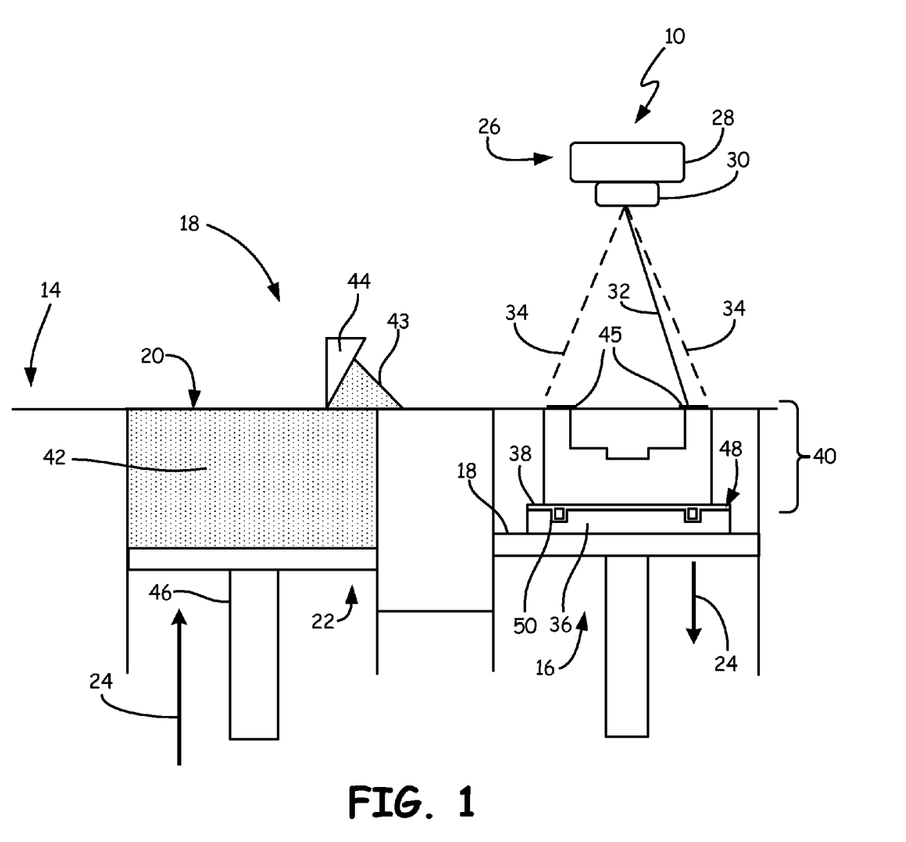
FIG. 1 schematically depicts an example powder bed deposition machine.

FIG. 1 shows powder bed deposition apparatus 10, and also includes build table 14, build platform 16, powder delivery apparatus 18, powder compartment 20, powder elevator platform 22, build directional arrows 24, energy beam apparatus 26, beam generator 28, outlet lens 30, steerable energy beam 32, steerable beam path 34, metal build plate 36, non-metallic bather layer 38, build assembly 40, powder supply 42, powder quantity 43, recoater 44, powder build layer 45, supply piston 46, removable powder bed working surface 48, and anchors 50.

Build table 14 includes build platform 16. Embodiments of apparatus 10 may utilize various additive manufacturing processes such as but not limited to direct laser sintering (DLS) manufacturing, direct laser melting (DLM) manufacturing, selective laser sintering (SLS) manufacturing, selective laser melting (SLM) manufacturing, laser engineering net shaping (LENS) manufacturing, electron beam melting (EBM) manufacturing, direct metal deposition (DMD) manufacturing, and others known in the art.

Build platform 16 can be any object which is capable of being mounted to powder bed deposition apparatus 10, and upon which one or more near-net shape components may be built. For example, platform 16 may include one or more build plates movable relative to build table 14. The build plates may have a metal upper surface over which additive manufacturing may be performed, as explained below.

Powder bed apparatus deposition apparatus 10 can include powder delivery system 18. In this example, powder delivery system 18 includes powder compartment 20 with powder elevator platform 22 disposed proximate to, and movable opposite build platform 16. Build arrows 24 indicate that powder elevator platform 22 is movable in a first vertical direction, and build platform 16 is movable in a second vertical direction opposite the first vertical direction. However, it will be appreciated that other powder supply arrangements can be used.

Energy beam apparatus 26 is capable of selectively steering at least one focused energy beam over quantities of metal powder supplied to build platform 16 by powder delivery system 18. This non-limiting example of energy beam apparatus 26 shows at least one beam generator 28 and outlet lens 30 adapted to steer energy beam 32 generally along beam path 34 toward build platform 16. Though FIG. 1 shows energy beam generator 26 steering beam 32 directly toward build platform 16, this is shown merely for simplicity of description. It will be appreciated that other more complex beam configurations (e.g., steering mirrors, prisms, and/or multi-axis CNC systems) can be incorporated to operate other embodiments of energy beam apparatus 26.

FIG. 1 also shows powder bed build plate 36 disposed on upper surface 18. A sacrificial non-metallic barrier layer 38 can be disposed over at least a portion of build plate 36. Sacrificial non-metallic barrier layer 38 can then serve as a substantial portion of an initial working surface for build assembly 40.

Powder delivery system 18 is capable of supplying successive quantities of metal powder to form successive powder build layers 45 to build assembly 40. In use, powder supply 42 is fed upward by elevator platform 22 and a quantity 43 is moved across build table 14 by recoater blade 44. Recoater blade 44 can alternatively take other forms such as a roller or a spray nozzle as appropriate. Powder quantity 43 can be spread evenly over a deposition surface to form powder build layer 45. Energy beam (e.g., laser or electron beam) 32 is scanned selectively over each powder build layer 45 to form a molten pool. Portions of the molten pool are solidified to form and adhere successive layers of a near-net shape component onto a preceding deposition surface. Each layer is built according to a computer model, which can be stored in an STL memory file or other electronic data file accessible by a controller (not shown) of powder bed deposition apparatus 10. After each successive layer, recoater 44 is returned to a starting position near elevator platform 22, while supply piston 46 advances upward to expose another layer from powder supply 42, while build platform 16 indexes down by approximately one layer thickness. Recoater 44 then spreads another quantity of powder 43 to form a new powder build layer 45. Selective areas of each successive deposited layer are sintered or otherwise joined to the preceding layer by energy beam 32 as described above. The process is repeated until build assembly 40 is complete with one or more near-net shape, solid freeform components built in a layerwise manner. It should be noted that FIG. 1 shows only one non-limiting example of an additive manufacturing process and apparatus, and is not meant to limit the invention to any single process known in the art.

In a conventional powder bed process, a near-net shape component is built directly onto a metal build plate. This requires the use of several large support structures (e.g., honeycombs) fused over substantially all of the metal build plate working surface. These large support structures are used to secure the in-process near-net shape component directly to the metal build plate, while dissipating heat and reducing thermal distortion of the near-net shape component. However, on completion of the build process, the entire combination must be thermally stress-relieved prior to separating the near-net shape component from the metal build plate. Separation has been achieved typically by machine tools such as saw blades and/or wire electrodischarge machining (EDM). Subsequently, the base of the near-net shape component must undergo a long machining process to remove large residual portions of the support structure. Thus formation and removal of the attendant support structures result in long processing times and substantial quantities of wasted build materials.

In contrast, build assembly 40 is formed on, and removably secured to, metal build plate 36. Build assembly 40 generally includes a near-net shape component built onto a removable powder bed working surface 48. Powder bed working surface 48 can include sacrificial non-metallic barrier layer 38, which is disposed over a substantial portion of build plate 36 during a build process. Powder bed working surface 48 can also include one or more anchors 50. Anchor(s) 50 can have an upper metal bonding surface (non-limiting examples shown in FIGS. 2A and 2B) which is flush with non-metallic barrier layer 38. To facilitate the build process, anchors 50 (or another metal bonding portion of the powder bed working surface are fused at the respective upper bonding surface to one or more near-net shape components 51.

Anchors 50 can be secured to build plate 36 so that component part(s) (shown in FIGS. 3 and 4) can be accurately built in a layerwise fashion on powder bed working surface 48. On completion, build assembly 40 can be removed from build plate 36 (shown in FIG. 3), with powder bed working surface 48 and the finished near-net shape component(s). Once separated (as shown in FIG. 4), the one or more near-net shape components have improved build quality with reduced waste and processing times.

Figure 2A:
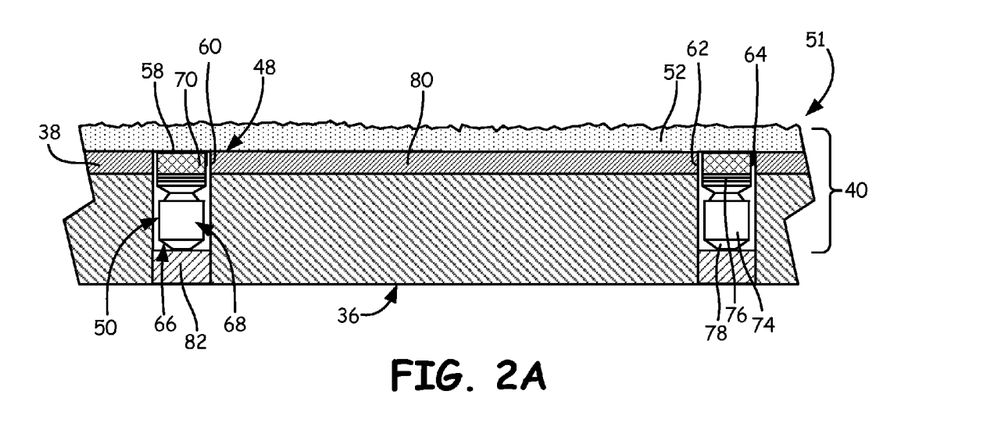
FIG. 2A shows an in-process build assembly including a non-metallic bather layer, anchor pins and a first powder build layer.
Figure 2B:
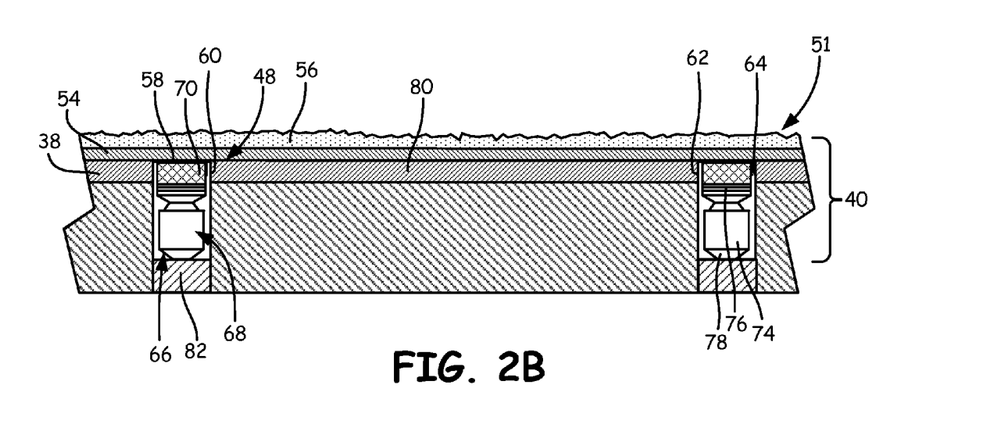
FIG. 2B shows the in-process build assembly of FIG. 2A after solidification of the first powder build layer and deposition of a second powder build layer.

FIGS. 2A and 2B show build assembly 40 as in-process near-net shape component part(s) 51 are built layerwise on powder bed working surface 48. FIGS. 2A and 2B also include first powder build layer 52, first component build layer 54, subsequent powder build layer 56, upper bonding surface 58, bather hole 60, bather hole edge 62, bonding surface edge 64, anchoring holes 66, anchor pins 68, localized support structures 70, anchor pin body 74, anchor pin upper surface 76, anchor pin lower surface 78, build plate upper surface 80, and shims 82.

In FIG. 2A, in-process build assembly 40 is removably secured to build plate 36. Build assembly 40 includes first powder build layer 52 disposed over at least a portion of powder bed working surface 48. FIG. 2B shows a later stage of in-process build assembly 40, with first component build layer 54 and subsequent powder build layer 56. At least a portion of first powder build layer 52 is selectively melted into a molten pool, for example, by selectively steering an energy beam to form a molten pool (not shown). At least a portion of the molten pool is then solidified into first component build layer 54. Subsequent powder build layer(s) 56 can then be selectively placed over some or all of each preceding component build layer (e.g., first component build layer 54). First powder build layer 50 can be selectively placed over some or all of powder bed working surface 48, for example, by a powder recoater 44 (shown in FIG. 1). Subsequent powder build layers can also be applied by powder recoater 44.

As noted with respect to FIG. 1, non-metallic barrier layer 38 can form a substantial portion of powder bed working surface 48. Non-metallic barrier layer 38 can limit thermal conductivity between in-process near-net shape component part(s) 51 and a metal upper surface of build plate 36. As seen in FIGS. 2A and 2B, powder bed working surface 48 can also include an upper bonding surface 58 of one or more anchors 50. Upper bonding surfaces 58 are substantially flush with non-metallic barrier layer 38. Non-metallic barrier layer 38 can serve as a thermal barrier between metal build plate 36 and in-process near-net shape component 51. In certain embodiments, barrier layer 38 comprises one or more ceramic sheets generally conforming to the metal upper surface of build plate 36. In certain embodiments, the ceramic sheet(s) can be selected from groups consisting of: an oxide ceramic, a silicate ceramic, and combinations thereof. The ceramic sheet(s) or other non-metallic barrier layer is selected to have a substantially lower thermal conductivity than metal build plate 36 and in-process near-net shape component 51.

Non-metallic barrier layer 38 substantially reduces the rate of heat transfer from the component build layers into the metal build plate 36. This allows a slower and more controlled rate of cooling of each component build layers, which limits thermal distortion of the component. The need for a large, complex thermally dissipating metal support structure (e.g., heat sink or honeycomb) fused to the metal build plate is therefore greatly reduced as compared to conventional build processes.

To accommodate bonding surfaces 58, at least one barrier hole 60 can be formed in non-metallic barrier layer 38. Barrier hole edge 62 can be aligned with a corresponding edge or perimeter 64 of each bonding surface 58. In this way, bonding surface(s) 58 are flush with non-metallic barrier layer 38 upon deposition of first powder build layer 52. When bonding surface(s) 58 are flush with barrier layer 38, it results in a substantially uniform powder bed working surface 48, so that recoater 44 (shown in FIG. 1) does not collide with bonding surface(s) 58, and alter the intended application of first powder build layer 52 and/or successive powder build layers 56.

As noted above, build assembly 40 can include one or more anchors 50. During a build process, anchor(s) 50 can be retained in corresponding anchoring hole(s) 66 recessed into build plate 36. Anchor(s) 50 can be removably secured to build plate 36 such that build assembly 40 is retained with upper bonding surface 58 flush with non-metallic barrier layer 38, forming a contiguous and removable powder bed working surface 48. Barrier hole edges 62 can also be aligned with corresponding edges of anchoring hole(s) 66.

In the example of FIGS. 2A and 2B, anchor 50 includes at least two elements, removable anchor pin 68 and optional localized support structures 70. Anchor pin(s) 68 can include body 74, upper surface 76, and lower surface 78. In certain embodiments, localized support structure 70 is metallurgically bonded to anchor pin upper surface 76 such that an upper surface of each support structure 70 defines each upper bonding surface 58. Thus in these embodiments, upper surface(s) 76 of anchor pin(s) 68 are recessed below upper surface 80 of build plate 36.

In this example, localized support structure 70 comprises a plurality of component build layers adhered to anchor pins 68. These may be formed using powder bed deposition apparatus 10 (shown in FIG. 1) prior to formation of first component build layer 54. However, in certain alternative embodiments, localized support structure 70 can be welded or otherwise fused to the pins prior to removably securing anchors 50 in anchoring holes 66. Alternatively, localized support structure 70 can be omitted from one or more anchor(s) 50. In these embodiments, upper surface 76 of anchor pin(s) 68 defines one or more bonding surfaces 58 flush with non-metallic bather layer 38 to form a contiguous removable powder bed working surface 48.

Unlike conventional systems, optional localized support structures 70 do not extend over a substantial portion of build plate 36 or build assembly 40. Rather, localized support structures 70 can be limited to local areas where they are needed to relieve or dissipate localized thermal stresses. Typically this is the area of in-process near-net shape component 51 located immediately above and/or proximate to anchor pins 68 and/or anchoring holes 66. In certain embodiments, localized support structures 70 are metallurgically bonded to upper surface 76 of one or more anchor pins 68. In certain of these embodiments, localized support structures 70 are formed by layerwise deposition of powder prior to layerwise deposition of powder build layers 52, 56. Alternatively, localized support structures 70 form a sacrificial portion of anchor pins 68 and are rebuilt after each build process. Localized support structures 70 can be added to anchor pins 68 prior to or after insertion into anchoring holes 66.

Figure 3:
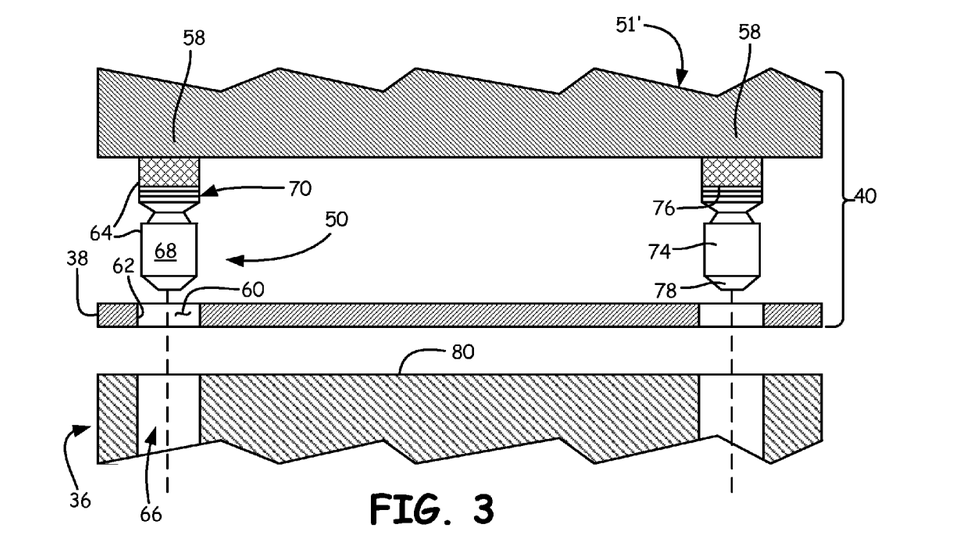
FIG. 3 illustrates a completed build assembly being removed from the build plate.
Figure 4:
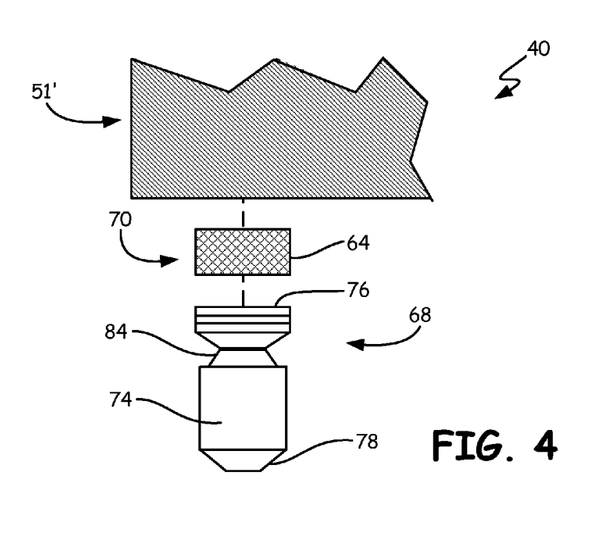
FIG. 4 shows separation of the anchor pins and the support structure from a near-net shape component.

FIG. 3 shows removal of build assembly 40 from build plate 36 after completion of near-net shape component 51'. During a build process, anchors 50 can be secured by any suitable retention means including, but not limited to, cooperating surfaces disposed on the respective bases of anchors 50 and anchoring holes 66. For example, FIGS. 2A and 2B show spacers or shims 82 disposed at the base of anchoring holes 66. Shims 82 of different heights can allow the use and reuse of standardized anchor pins 50 while ensuring that metal bonding surface(s) 58 remain flush with non-metallic barrier layer 38. Shims 82 can also permit the use of standard designs for optional localized support structures 70. These standard designs can be developed with minimum or predetermined thermal properties to minimize thermal distortion of the near-net shape component.

Additionally or alternatively, anchor pins 68 and anchoring holes 66 can have diameters sized relative to one another which result in an effective interference fit. In certain of these embodiments, the relative diameters of anchor pins 68 and anchoring holes 66 are configured such that anchor pins 68 are freely insertable and removable at low (e.g., ambient or slightly elevated temperatures), and held securely at higher (e.g., operating) temperatures. In this way, anchor pins 68 can be inserted at the beginning of a build process, and retained due to differential thermal expansion of pins and holes 68, 66. Thus build assembly 40 can be secured in place until sufficient cooling has occurred so as to permit removal of build assembly 40 from build plate 36 (as shown in FIG. 3) only at an appropriate time, which can prevent damage to near-net shape component 51'.

Regardless of the exact mode of securing anchors 50 to metal build plate 36, FIG. 3 shows that build assembly 40 with powder bed working surface 48 can be readily separated from metal build plate 36. Build assembly 40 can simply be lifted out from metal build plate 36 without the need to cut them apart (e.g., via saw or electrodischarge machining) as in conventional processes. This also eliminates the need to perform a stress-relieving process on the entire build assembly and build plate.

FIG. 3 shows non-metallic barrier layer 38 as having been separated from both metal build plate 36 and the remainder of build assembly 40. However, it will be appreciated that different portions of non-metallic barrier layer 38 may adhere to one or both of metal build plate 36 and completed near-net shape component 51'. The behavior of non-metallic barrier layer 38 during removal of build assembly 40 will depend on a number of factors including the particular surface and structural properties of each element as well as the temperature of build plate 36 and build assembly 40 at the time of removal.

FIG. 4 shows build assembly 40 separated into anchors 50 and near-net shape component 51' as shown in FIG. 4. Non-metallic barrier layer 38 is omitted but can be removed as seen in FIG. 3.

The elements of build assembly 40 can be easily separated by pulling or torquing anchor 50 relative to completed near-net shape component 51'. Anchor pin 68 can optionally include notch 84 or other recess in anchor pin body 74. FIG. 4 shows notch 84 circumscribing anchor pin body 74 to provide additional surface or gripping area which simplifies separation of anchor 50 from near net shape component 51'.

In certain embodiments optional localized support structure 70 is formed as a honeycomb or other shape having increased surface area, helping it to operate as a localized heat sink. With reduced mechanical strength of the honeycomb shape, build assembly 40 can preferentially break across localized support structure 70. The limited remnants of localized support structure 70 can be easily and quickly machined away from completed near-net shape component 51'. Alternatively, in the absence of localized support structure 70, a portion of anchor pin 68 can be weakened or produced with reduced mechanical strength to facilitate preferential breakage of the anchor relative to near-net shape component 51'.

Reduced thermal conductivity afforded by non-metallic barrier layer 38 also substantially reduces thermal distortion associated with the large complex support structures typical of conventional powder bed deposition systems. Any distortion caused by high thermal gradients between build assembly 40 and metal build plate 36 can be localized immediately around anchors 50. Thus any resulting post-deposition processing to remove support structure 70 and to repair thermal distortion damage can be minimized.

Figure 5:
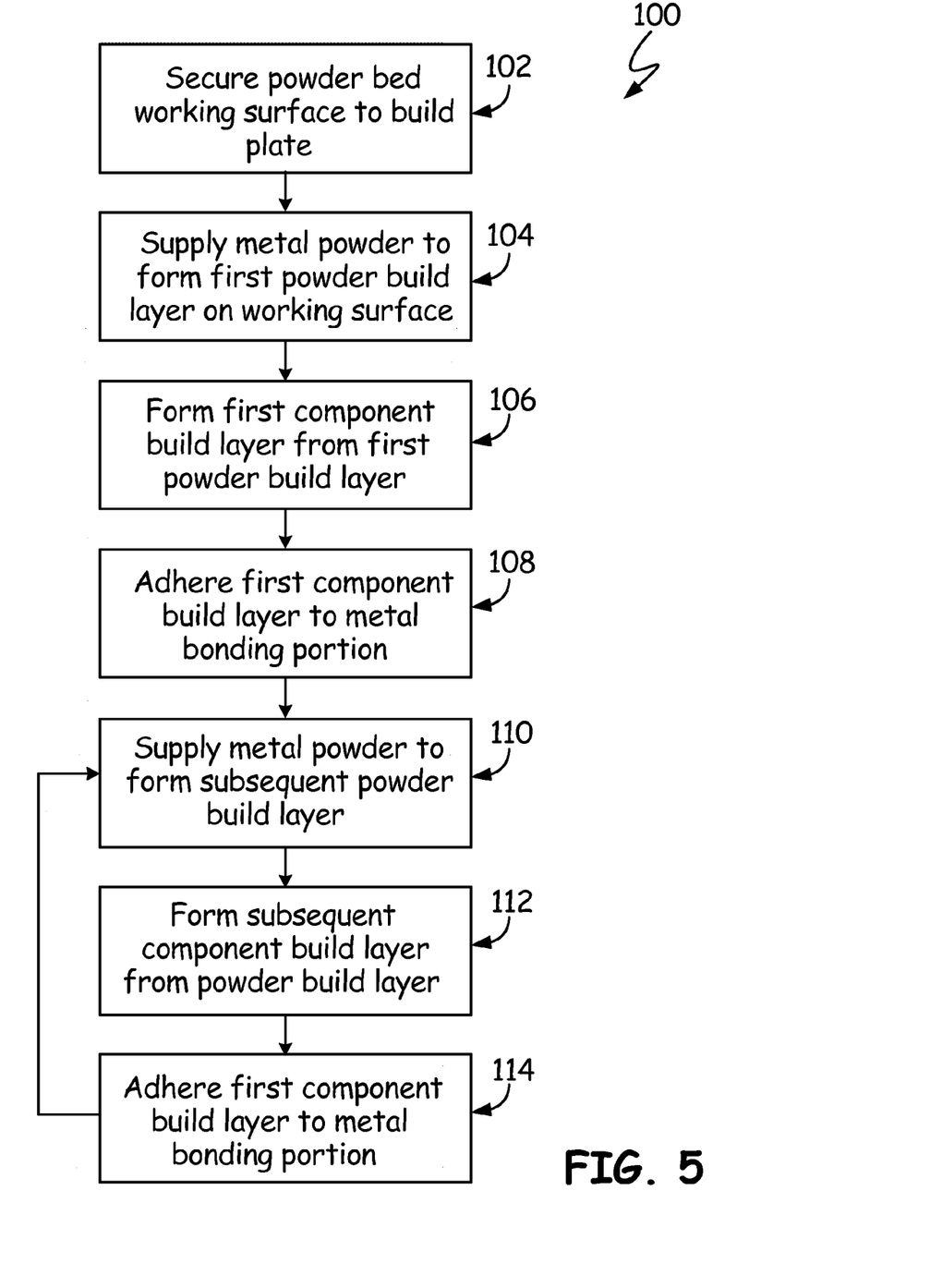
FIG. 5 is a chart showing steps of an example build process.

FIG. 5 is a chart depicting steps of method 100 for manufacturing a near-net shape component. Step 102 includes removably securing a powder bed working surface to a movable build plate with a metal upper surface. The powder bed working surface can have a non-metallic barrier portion such as one or more ceramic sheets disposed over and generally conforming to the metal upper surface of the build plate. A metal bonding portion is flush with the non-metallic bather portion, and can include one or more metal bonding surfaces. The metal bonding surfaces, for example, can include a surface of an anchor recessed into and/or removably secured to the build plate. Each anchor may include an anchor pin. A sacrificial localized support structure can optionally be metallurgically bonded to an upper surface of the anchor pin.

At step 104, a quantity of metal powder is supplied from a powder delivery system to form a first powder build layer on the powder bed working surface. Step 106 includes forming a first component build layer by operating an energy beam apparatus to selectively steer at least one focused energy beam over the first powder build layer. The energy beam can be, for example, a laser or electron beam. In certain embodiments, the energy beam can selectively melt a portion of the first powder build layer into a molten powder pool. Step 108 comprises adhering the first component build layer to the metal bonding portion of the powder bed working surface. In certain embodiments, at least a portion of the molten powder pool from step 106 is subsequently solidified. Alternatively, the energy beam melts and resolidifies the powder with minimal formation of an intervening molten pool.

Method 100 can also include step 110 in which a subsequent layer of powder is supplied from the powder delivery system to form a subsequent powder build layer over at least a portion of a preceding component build layer. In step 112, a subsequent component build layer can be formed by operating the energy beam apparatus to selectively steer the at least one focused energy beam over the subsequent powder build layer. Step 114 comprises adhering the subsequent component build layer onto a portion of the preceding component build layer. Similar to steps 106 and 108, steps 112 and 114 can be performed with or without formation of an intervening molten pool.

Steps 110, 112, and 114 can be iteratively performed to form a build assembly comprising the near-net shape component and the powder bed working surface. After completion of the near-net shape component, the build assembly can be removed from the build plate. The build assembly can also include anchors, localized support structures, or other elements adhered to the near-net shape component. Some of all of these elements may have served as the metal bonding surfaces for the powder bed working surface. One example mode of removing the build assembly from the build plate is shown and described with reference to FIG. 3.

The near-net shape component can then be separated from the remainder of the build assembly. This can be done in any suitable manner. One example mode of separating the near-net shape component is shown and described with reference to FIG. 4.

Discussion of Possible Embodiments

The following are non-exclusive descriptions of possible embodiments of the present invention:

A powder bed deposition apparatus comprises a movable build plate, a powder delivery system, an energy beam apparatus capable of selectively steering at least one focused energy beam over successive quantities of metal powder, a non-metallic barrier layer, and an anchor removably secured to the build plate. The non-metallic barrier layer is disposed over a metal upper surface of the build plate. The anchor has a metal bonding surface flush with the non-metallic barrier layer. The non-metallic barrier layer and the anchor defining a removable build assembly with a powder bed working surface.

The apparatus of the preceding paragraph can optionally include, additionally and/or alternatively, any one or more of the following features, configurations and/or additional components:

A further embodiment of the foregoing powder bed deposition apparatus, wherein the energy beam is selected from: an electron beam, and a laser beam.

A further embodiment of any of the foregoing powder bed deposition apparatus, wherein the build plate includes at least one anchoring hole adapted to retain the removable build assembly during a build process.

A further embodiment of any of the foregoing powder bed deposition apparatus, wherein the non-metallic barrier layer includes at least one hole having an edge aligned with an edge of the at least one anchoring hole.

A further embodiment of any of the foregoing powder bed deposition apparatus, wherein the anchor comprises a removable anchor pin including a body, an upper surface, a lower surface, and a notch at least partially circumscribing the body between the upper and lower surfaces.

A further embodiment of any of the foregoing powder bed deposition apparatus, wherein the upper surface of the anchor pin defines at least a portion of the metal bonding surface.

A further embodiment of any of the foregoing powder bed deposition apparatus, wherein the anchor further comprises a sacrificial localized support structure metallurgically bonded to the upper surface of the anchor pin, the localized support structure having a surface defining at least a portion of the metal bonding surface.

A further embodiment of any of the foregoing powder bed deposition apparatus, wherein the localized support structure comprises a plurality of component build layers formed using the powder bed deposition apparatus.

A further embodiment of any of the foregoing powder bed deposition apparatus, wherein the removable build assembly also includes a near-net shape component comprising a first component build layer including a first portion adhered to the metal bonding surface of the anchor, and a second portion disposed on the non-metallic bather layer.

A further embodiment of any of the foregoing powder bed deposition apparatus, wherein the non-metallic barrier layer comprises a ceramic sheet generally conforming to the metal upper surface of the build plate.

A further embodiment of any of the foregoing powder bed deposition apparatus, wherein the apparatus is selected from one of: a direct laser sintering (DLS) apparatus, a direct laser melting (DLM) apparatus, a selective laser sintering (SLS) apparatus, a selective laser melting (SLM) apparatus, a laser engineering net shaping (LENS) apparatus, an electron beam melting (EBM) apparatus, and a direct metal deposition (DMD) apparatus.

A build platform comprises a build plate with a metal upper surface, and a build assembly removably secured to the build plate. The build assembly includes a powder bed working surface having a non-metallic barrier portion and a metal bonding portion. the non-metallic bather portion is disposed over the metal upper surface of the build plate, and the metal bonding portion is flush with the non-metallic barrier portion.

The build platform of the preceding paragraph can optionally include, additionally and/or alternatively, any one or more of the following features, configurations and/or additional components:

A further embodiment of the foregoing build platform, wherein the non-metallic barrier portion comprises a ceramic sheet generally conforming to the metal upper surface of the build plate.

A further embodiment of any of the foregoing build platforms, wherein the metal bonding portion comprises a surface of at least one anchor recessed below the metal upper surface of the build plate.

A further embodiment of any of the foregoing build platforms, wherein the anchor comprises an anchor pin removably secured to the build plate during a build process, the anchor pin including a body, an upper surface, a lower surface, and a notch at least partially circumscribing the body between the upper and lower surfaces.

A further embodiment of any of the foregoing build platforms, wherein the anchor further comprises a sacrificial localized support structure metallurgically bonded to the upper surface of the anchor pin.

A further embodiment of any of the foregoing build platforms, wherein the build assembly also includes a near-net shape component comprising a plurality of component build layers including a first component layer metallurgically bonded to the metal bonding surface of the anchor.

A method for manufacturing a near-net shape component comprises removably securing a powder bed working surface to a movable build plate with a metal upper surface. The powder bed working surface has a non-metallic barrier portion disposed over the metal upper surface of the build plate, and a metal bonding portion flush with the non-metallic barrier portion. A quantity of metal powder is supplied from a powder delivery system to form a first powder build layer on the powder bed working surface. A first component build layer is formed by operating an energy beam apparatus to selectively steer at least one focused energy beam over the first powder build layer. The first component build layer is adhered to the metal bonding portion of the powder bed working surface.

The method of the preceding paragraph can optionally include, additionally and/or alternatively, any one or more of the following features, configurations and/or additional components or steps:

A further embodiment of the foregoing method, wherein the non-metallic barrier portion comprises a ceramic sheet generally conforming to the metal upper surface of the build plate.

A further embodiment of any of the foregoing methods, wherein the metal bonding portion comprises an upper surface of an anchor removably secured to the build plate.

A further embodiment of any of the foregoing methods, wherein the metal bonding portion comprises a surface of a sacrificial localized support structure metallurgically bonded to an anchor pin removably secured to the build plate.

A further embodiment of any of the foregoing methods, further comprising: supplying a subsequent layer of powder from the powder delivery system to form a subsequent powder build layer over at least a portion of a preceding component build layer; forming a subsequent component build layer by operating the energy beam apparatus to selectively steer the at least one focused energy beam over the subsequent powder build layer; and adhering the subsequent component build layer onto a portion of the preceding component build layer.

A further embodiment of any of the foregoing methods, further comprising: iteratively performing the steps of supplying a subsequent layer of powder, forming a subsequent component build layer, and adhering the subsequent component build layer to form a build assembly comprising the near-net shape component and the powder bed working surface.

A further embodiment of any of the foregoing methods, further comprising: removing the build assembly from the build plate.

A further embodiment of any of the foregoing methods, further comprising: separating the near-net shape component from the remainder of the build assembly.

Although the present invention has been described with reference to preferred embodiments, workers skilled in the art will recognize that changes may be made in form and detail without departing from the spirit and scope of the invention.

The invention claimed is:

1. A powder bed deposition apparatus comprising:
    a movable build plate with a metal upper surface;
    a powder delivery system capable of supplying successive quantities of metal powder to the movable build plate;
    an energy beam apparatus capable of selectively steering at least one focused energy beam over each of the successive quantities of metal powder;
    a non-metallic barrier layer disposed over the metal upper surface of the build plate; and
    an anchor removably secured to the build plate, the anchor having a metal bonding surface flush with the non-metallic barrier layer, the non-metallic barrier layer and the anchor defining a removable build assembly with a powder bed working surface;
    wherein the anchor comprises:
        a removable anchor pin including a body, an upper surface, a lower surface, and a notch at least partially circumscribing the body between the upper and lower surfaces; and
        a sacrificial localized support structure metallurgically bonded to the upper surface of the anchor pin, the localized support structure having a surface defining at least a portion of the metal bonding surface.

2. The powder bed deposition apparatus of claim 1, wherein the energy beam is selected from: an electron beam, and a laser beam.

3. The powder bed deposition apparatus of claim 1, wherein the build plate includes at least one anchoring hole adapted to retain the removable build assembly during a build process.

4. The powder bed deposition apparatus of claim 3, wherein the non-metallic barrier layer includes at least one hole having an edge aligned with an edge of the at least one anchoring hole.

5. The powder bed deposition apparatus of claim 1, wherein the upper surface of the anchor pin defines at least a portion of the metal bonding surface.

6. The powder bed deposition apparatus of claim 1, wherein the localized support structure comprises:
a plurality of component build layers formed using the powder bed deposition apparatus.

7. The powder bed deposition apparatus of claim 1, wherein the removable build assembly also includes an in-process near-net shape component comprising:
a first component build layer including a first portion adhered to the metal bonding surface of the anchor, and a second portion disposed on the non-metallic barrier layer.

8. The powder bed deposition apparatus of claim 1, wherein the non-metallic barrier layer comprises:
a ceramic sheet generally conforming to the metal upper surface of the build plate.

9. The powder bed deposition apparatus of claim 1, wherein the apparatus is selected from one of: a direct laser sintering (DLS) apparatus, a direct laser melting (DLM) apparatus, a selective laser sintering (SLS) apparatus, a selective laser melting (SLM) apparatus, a laser engineering net shaping (LENS) apparatus, an electron beam melting (EBM) apparatus, and a direct metal deposition (DMD) apparatus.

10. A build platform comprising:
a build plate with a metal upper surface; and
a build assembly removably secured to the build plate, the build assembly including a powder bed working surface having a non-metallic barrier portion and a metal bonding portion, the non-metallic barrier portion disposed over the metal upper surface of the build plate, and the metal bonding portion flush with the non-metallic barrier portion;
wherein the metal bonding portion comprises a surface of at least one anchor recessed below the metal upper surface of the build plate, the at least one anchor comprising:
an anchor pin removably secured to the build plate during a build process, the anchor pin including a body, an upper surface, a lower surface, and a notch at least partially circumscribing the body between the upper and lower surfaces; and
a sacrificial localized support structure metallurgically bonded to the upper surface of the anchor pin.

11. The build platform of claim 10, wherein the non-metallic barrier portion comprises:
a ceramic sheet generally conforming to the metal upper surface of the build plate.

12. The build platform of claim 10, wherein the build assembly also includes an in-process near-net shape component comprising:
a plurality of component build layers including a first component layer metallurgically bonded to the metal bonding surface of the anchor.

13. A method for manufacturing a near-net shape component, the method comprising:
removably securing a powder bed working surface to a movable build plate with a metal upper surface, the powder bed working surface having a non-metallic barrier portion and a metal bonding portion, the non-metallic barrier portion disposed over the metal upper surface of the build plate, and the metal bonding portion flush with the non-metallic barrier portion;
supplying a quantity of metal powder from a powder delivery system to form a first powder build layer on the powder bed working surface;
forming a first component build layer by operating an energy beam apparatus to selectively steer at least one focused energy beam over the first powder build layer; and
adhering the first component build layer to the metal bonding portion of the powder bed working surface;
wherein the metal bonding portion comprises a surface of at least one anchor recessed below the metal upper surface of the build plate, the at least one anchor comprising:
an anchor pin removably secured to the build plate during a build process, the anchor pin including a body, an upper surface, a lower surface, and a notch at least partially circumscribing the body between the upper and lower surfaces; and
a sacrificial localized support structure metallurgically bonded to the upper surface of the anchor pin.

14. The method of claim 13, wherein the non-metallic barrier portion comprises:
a ceramic sheet generally conforming to the metal upper surface of the build plate.

15. The method of claim 13, wherein the metal bonding portion comprises:
an upper surface of an anchor removably secured to the build plate.

16. The method of claim 13, wherein the metal bonding portion comprises:
a surface of a sacrificial localized support structure metallurgically bonded to an anchor pin removably secured to the build plate.

17. The method of claim 13, further comprising:
supplying a subsequent layer of powder from the powder delivery system to form a subsequent powder build layer over at least a portion of a preceding component build layer;
forming a subsequent component build layer by operating the energy beam apparatus to selectively steer the at least one focused energy beam over the subsequent powder build layer; and
adhering the subsequent component build layer onto a portion of the preceding component build layer.

18. The method of claim 17, further comprising:
iteratively performing the steps of supplying a subsequent layer of powder, forming a subsequent component build layer, and adhering the subsequent component build layer to form a build assembly comprising the near-net shape component and the powder bed working surface.

19. The method of claim 18, further comprising:
removing the build assembly from the build plate.

20. The method of claim 19, further comprising:
separating the near-net shape component from the remainder of the build assembly.

* * * * *

UNITED STATES PATENT AND TRADEMARK OFFICE
CERTIFICATE OF CORRECTION

| | |
|---|---|
| PATENT NO. | : 9,597,730 B2 |
| APPLICATION NO. | : 14/784904 |
| DATED | : March 21, 2017 |
| INVENTOR(S) | : Sergey Mironets, Agnes Pu Hang Chau Klucha and Wendell V. Twelves, Jr. |

Page 1 of 2

It is certified that error appears in the above-identified patent and that said Letters Patent is hereby corrected as shown below:

In the Specification

Column 2, Line 11:
Delete "bather"
Insert --barrier--

Column 2, Line 31:
Delete "bather"
Insert --barrier--

Column 4, Line 27:
Delete "bather hole 60, bather"
Insert --barrier hole 60, barrier--

Column 5, Line 55:
Delete "bather"
Insert --barrier--

Column 7, Line 33:
Delete "bather"
Insert --barrier--

Column 9, Line 6:
Delete "bather"
Insert --barrier--

Signed and Sealed this
First Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,597,730 B2

Column 9, Line 23:
Delete "bather"
Insert --barrier--